US006823199B2

(12) United States Patent
Gough

(10) Patent No.: US 6,823,199 B2
(45) Date of Patent: Nov. 23, 2004

(54) SYSTEM AND METHOD FOR CONTROLLING A WIRELESS DEVICE NOTIFICATION ALERT

(75) Inventor: Corey D. Gough, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 561 days.

(21) Appl. No.: 09/893,873

(22) Filed: Jun. 29, 2001

(65) Prior Publication Data

US 2003/0003965 A1 Jan. 2, 2003

(51) Int. Cl.[7] ................................................. H04B 1/38
(52) U.S. Cl. ................. 455/567; 455/404.1; 455/456.4; 340/540
(58) Field of Search ........................... 455/404.1, 404.2, 455/405, 415, 421, 456.4, 550.1, 567; 340/540, 3.1, 5.1

(56) References Cited

U.S. PATENT DOCUMENTS

| | | | | |
|---|---|---|---|---|
| 5,991,614 A | * | 11/1999 | Oura ........................ | 455/404.1 |
| 6,011,973 A | * | 1/2000 | Valentine et al. ......... | 455/456.6 |
| 6,122,486 A | * | 9/2000 | Tanaka et al. ............. | 455/68 |
| 6,222,458 B1 | * | 4/2001 | Harris ....................... | 340/686.6 |
| 6,314,282 B1 | * | 11/2001 | Weber et al. ............. | 455/404.2 |
| 6,496,703 B1 | * | 12/2002 | da Silva .................... | 455/456.4 |
| 6,603,397 B2 | * | 8/2003 | Bronson .................... | 340/540 |
| 6,625,455 B1 | * | 9/2003 | Ariga ........................ | 455/565 |
| 6,650,894 B1 | * | 11/2003 | Berstis et al. ............... | 455/420 |
| 2002/0010008 A1 | * | 1/2002 | Bork et al. ................. | 455/567 |
| 2003/0034887 A1 | * | 2/2003 | Crabtree et al. ............ | 340/539 |
| 2004/0119633 A1 | * | 6/2004 | Oswald et al. ............... | 342/70 |

FOREIGN PATENT DOCUMENTS

WO   WO 00/13428   3/2000

* cited by examiner

*Primary Examiner*—Tilahun Gesesse
(74) *Attorney, Agent, or Firm*—Kenyon & Kenyon

(57) ABSTRACT

Wireless device audible alert control signal generating systems and methods are presented. The control signal may be used to either enable or disable the audible alert of a wireless device. The signal may be generated as a function of the motion of an object entering or exiting a quiet zone. An embodiment for a system in accordance with the invention includes a transmitter to transmit a control signal to either disable or enable an audible alert of a wireless device. An antenna may be operatively coupled to the transmitter. A motion sensor to detect objects passing through a field of detection may be used to trigger the emission of the control signal. A controller operatively coupled to both the motion sensor and transmitter may command the transmitter to transmit the control signal as a function of a direction of motion detected by the motion sensor. An embodiment for a method in accordance with the invention includes detecting an object in an object detection area. A direction of motion of the object with respect to a reference point may be determined. A wireless device audible alert control signal may then be generated as a function of the direction of motion of the object.

8 Claims, 9 Drawing Sheets

SYSTEM AND METHOD FOR CONTROLLING A WIRELESS DEVICE NOTIFICATION ALERT

FIELD OF THE INVENTION

The invention relates to wireless communication and the cooperative control of wireless devices without user intervention.

BACKGROUND

Wireless devices, such as cellular telephones, pagers, and handheld computing devices, have become affordable to millions of persons. Their benefit to society is untold and yet readily apparent. Cellular telephones have allowed persons to be in communication with one another around the clock and at almost any location. Pagers, once used only for receipt and display of a telephone number, now support voice and electronic messaging. Many pagers allow both reception and transmission of messages. Handheld computing devices, such as personal digital assistants ("PDAs"), are able to run a multitude of software programs, with applications that feature games, word and data processing, and more. Furthermore, handheld computing devices, via wireless communication links, are able to access the Internet and other communication networks.

The distinction between various types of wireless devices is becoming blurred. The increasing homogeneity results as the functionality of one type of wireless device is brought within the functionality of another type. For example, cellular telephones that double as pagers, and cellular telephones that include the functionality of a PDA are now available.

Wireless devices typically are easy to use. Because of their ease of use, affordability, and availability, wireless devices have been purchased, or are used, by persons in virtually every strata of society. Because of their size and ease of portability, these devices can be found in almost every location.

Many wireless devices appear to have a common feature. In order to alert a user of some event, for example, the reception of a cellular telephone call or of a page, most wireless devices emit a notification alert, such as a sound. Some sounds are reminiscent of a standard telephone ringer; other sounds may include the themes to popular television shows, portions of popular music, animal sounds, or customized sounds. Many wireless devices that include keyboards, or pointing/data-entry devices, may emit key-click, data entry acknowledgment, warning, error alert, or other sounds.

Emission of the sounds from a wireless device may be from a sound control unit implemented, for example, in both hardware and software. The sound control system may control both the audible alerts broadcast to a wireless device user, as well as allow the user to listen to sounds played through the wireless device, such as, for example, the sound of the voice of a calling party on a cellular telephone, or music or other audible content of an Internet web page on a handheld computing device. On one hand, the audible alert sounds serve a valuable and useful purpose to the user of the wireless device; on the other hand however, the audible alert sounds may be quite an annoyance to persons within earshot of the wireless device.

Many wireless devices provide the user with an option to turn off the audible alert of the device. Some devices allow a user to select between an audible alert and a vibrating alert. Many times, where common courtesy may dictate that a user should disable the audible alert of the user's wireless device, the user simply fails to do so. This failure may be due to the user's inability to determine how to shut off the audible alert, or it may be due to the user simply forgetting that the wireless device may suddenly sound an alert in a location where persons customarily maintain a quiet environment. A location that has been designated as a place where audible alerts are discouraged or prohibited may be referred to herein as a "quiet zone." Such locations may include libraries, restaurants, theatres, public transportation vehicles, classrooms, and courtrooms.

BRIEF DESCRIPTION OF THE DRAWINGS

The various features of the invention will best be appreciated by simultaneous reference to the description which follows and the accompanying drawings, wherein like numerals indicate like elements, and in which.

DETAILED DESCRIPTION

Embodiments of the present invention provide a control signal generating system to disable audible alerts of wireless devices without a need for user intervention. The present invention may act cooperatively with the wireless device; no jamming techniques are required, the control signal need not interfere with reception of other signals intended to be received by the wireless device. In one embodiment, the present invention uses a signal, transmitted by a transmitter, to command a wireless device to turn off its audible alert. A transmitter may feed a set of antennas that can be used to radiate signals in various directions; overlap of antenna radiation patterns may occur. The set of antennas may be fed, for example, by a single transmitter whose output is divided among the set of antennas or by a single transmitter whose output may be multiplexed to each antenna in the set of antennas. The transmitter may transmit the signal at a low power level, so that only wireless devices substantially within the immediate proximity of a transmitting antenna may effectively detect the signal. When the wireless device detects and/or decodes the signal, the wireless device may disable its audible alert. In an embodiment, a transmitter may transmit a command to disable, or enable, an audible alert of a wireless device as a function of a detected direction of motion of an object passing through a boundary, such as a doorway. The invention may now be more fully understood by reference to the following text and figures.

Figure 1:
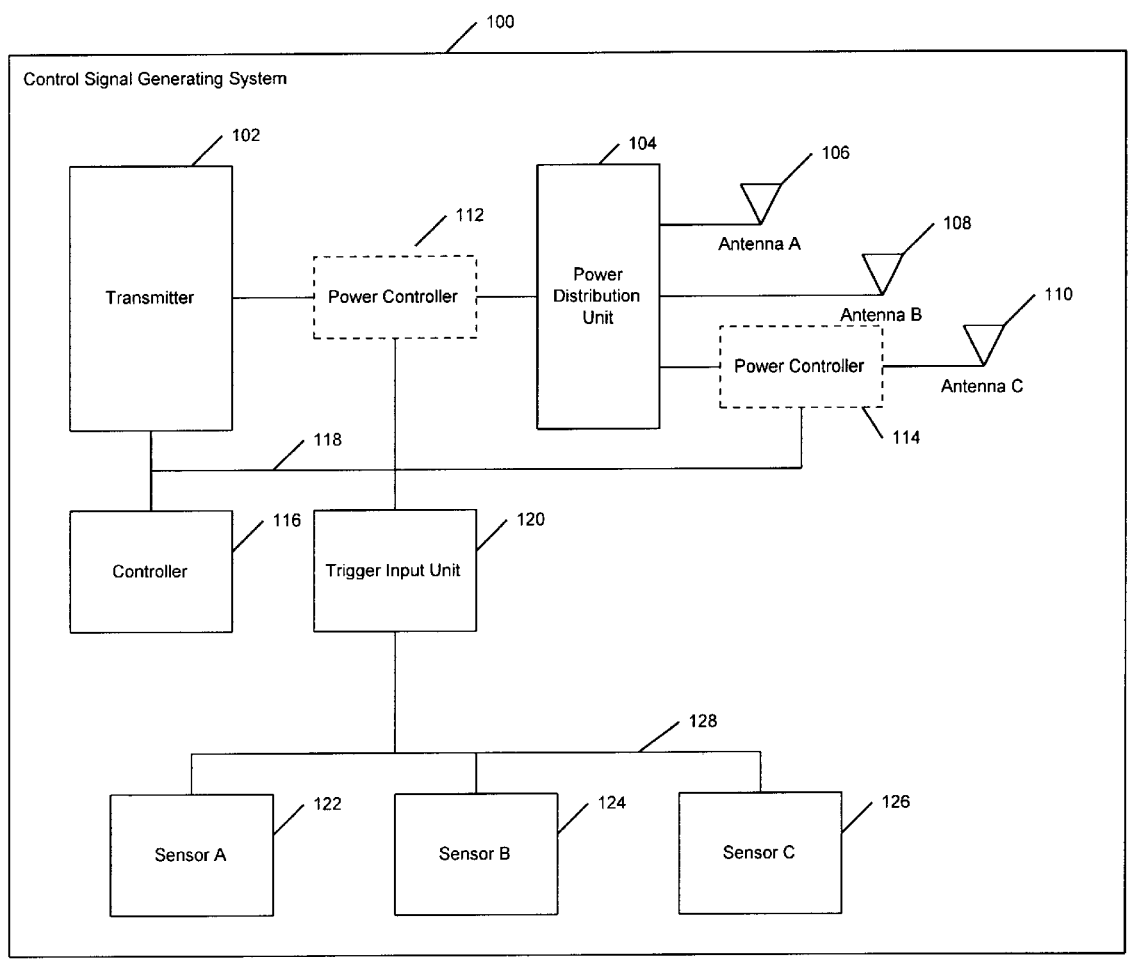
FIG. 1 is a block diagram of a transmitter in accordance with an embodiment of the invention.

FIG. 1 is a block diagram of a control signal generating system 100 in accordance with an embodiment of the invention. The control signal generating system 100 may include: a transmitter 102 to generate a signal used to control a sound control unit of a wireless device; a power distribution unit 104, such as a divider or splitter, to distribute signal power to various output devices; a set of antennas, such as antennas A 106, B 108, and C 110 coupled to the power distribution unit 104, to radiate the signal produced by the transmitter 102 into free space; and a controller 116 to control operation of the system; all coupled to a bus 118.

The antennas 106, 108, 110 may be any antenna suitable for the transmission frequency of the signal generated by the transmitter. They need not be similar. Various antennas, having various radiation patterns may be used to provide coverage to areas (i.e., quiet zones) of varying size and shape. Radiation patterns may be used to reduce signal power in certain directions emanating from the antenna. Areas receiving reduced signal power may be areas where the cooperative disabling of the audible alert of a wireless device is not desired. Conversely, radiation patterns may be used to increase signal power in certain directions emanating from the antenna. These areas may include areas where the cooperative disabling of the audible alert system of a wireless device is desirable. The use of a plurality of antennas might allow for lower radiated power from each antenna as well as improved directional control of radiated signals by, for example, the use of directional antennas. While FIG. 1 is illustrated as including three antennas coupled to a power distribution unit 104, any number of antennas, including one antenna coupled to the transmitter 102 may be used without departing from the scope of the invention.

The output power of the transmitter 102 may be varied to increase or decrease the power of the signal being radiated from the antennas 106, 108, 110. Variation of the radiated power from an antenna may be implemented with a power controller 112, shown as a dashed box, coupled between the transmitter 102 and the power distribution unit 104, and/or a power controller 114 coupled between the power distribution unit 104 and an antenna, such as antenna 110. Any combination of numbers of power controllers 112, 114 and locations of power controllers is within the scope of the invention. The power controller 112, 114 may include a mechanically and or electrically variable attenuator and may additionally or alternatively include a fixed or variable gain amplifier. A power controller 112, 114 may be coupled to the controller 116 via bus 118. The controller 116 may control operating parameters of the power controller 112, 114. While the power controller 112, 114 is illustrated as existing separately from, but coupled between the transmitter 102 and the antennas 106, 108, 110, the power controller may be included within the functionality of the transmitter 102, power distribution unit 104, and/or the antennas 106, 108, 110.

The controller 116 may provide instructions to the transmitter 102 and power controller(s) 112, 114. Instructions may include, for example, assertions of power levels, assertions of attenuation or gain values, output frequency control, transmitter output signal on/off, and control of modulation and data parameters, if any, of the signal generated by the transmitter 102.

A control signal generating system 100 may also include a trigger input unit 120. The trigger input unit 120 may receive triggers from devices or sensors or devices 122, 124, 126 via bus 128. The triggers may be used to indicate whether a wireless device audible alert enable or disable signal is to be transmitted from the control signal generating system 100. The trigger input unit 120 may communicate with the controller 116 via bus 118. Other methods of coupling the trigger input unit to the controller 116, or of coupling the sensors 122, 124, 126 to the trigger input unit 120 may be used without departing from the scope of the invention.

The functionality of the trigger input unit 120 might be included within the controller 116. Examples of the use of triggers to indicate whether a wireless device audible alert enable or disable signal is to be transmitted from the control signal generating system 100 may be a trigger event received from a sensor such as a motion detector. The motion detector may indicate that an object has a direction of motion that indicates either an entry or exit into a quiet zone.

In an embodiment of the invention, the signal generated by the transmitter 102 may include data, including data indicative of whether the wireless device's audible alert is to be enabled or disabled. However, in another embodiment of the invention, the signal need not include data. The reception at the wireless device of a threshold power level at the signal's frequency could cause the wireless device to disable its audible alert system.

The signal and its characteristics may be changed without departing from the scope of the invention. In various embodiments of the invention, the signal may be a continuous wave tone (i. e., an unmodulated carrier) or a carrier modulated with data. In various embodiments, the control signal generating system 100 may radiate the signal continuously, periodically, randomly, or on demand as a result of a triggering event, such as the detection of a trigger signal from a sensor, such as a motion detector. The control signal may conform to any standard, such as, for example, telecommunications, wireless, wireless telephony or wireless networking standards, or it may exist outside of known standards.

Figure 2:
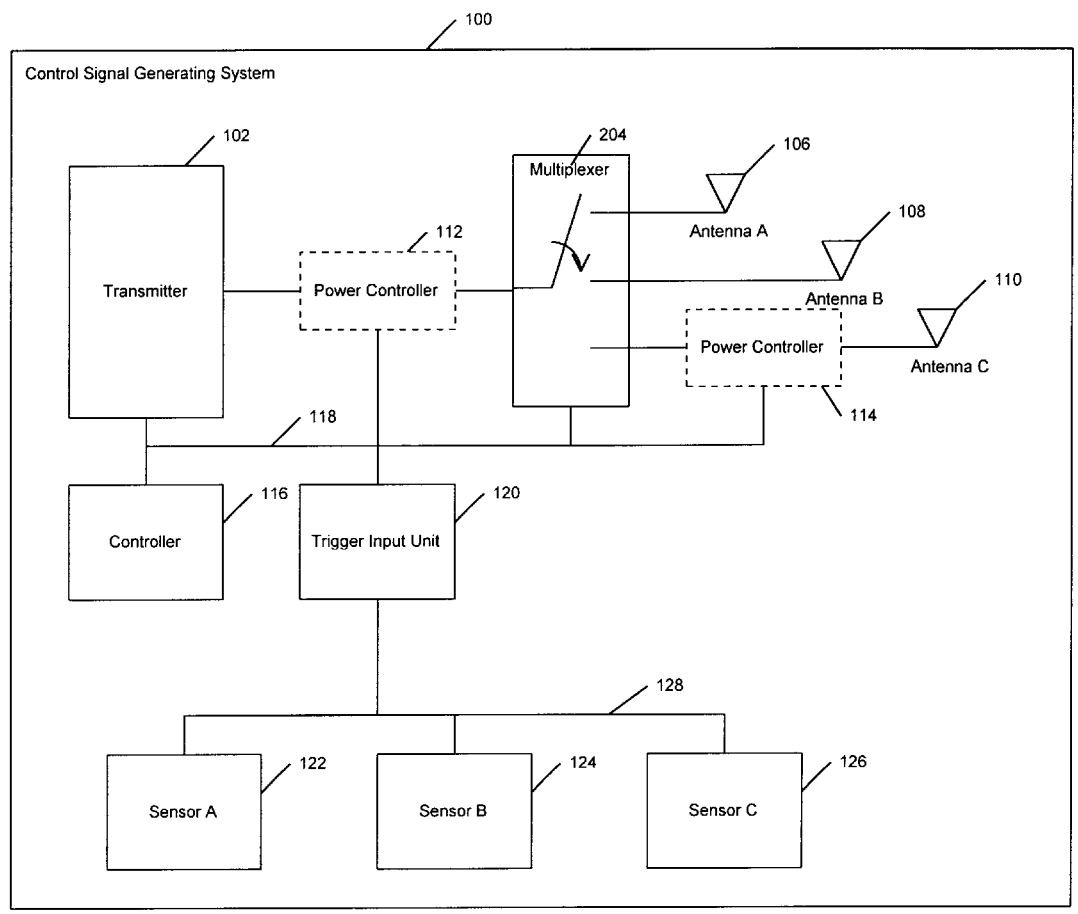
FIG. 2 is a block diagram of an alternate embodiment of a control signal generating system 100 in accordance with an embodiment of the invention.

FIG. 2 is a block diagram of an alternate embodiment of a control signal generating system 100 in accordance with an embodiment of the invention. The components of FIG. 2 are similar to the components of FIG. 1, however, a multiplexer 204 is illustrated in place of the power distribution unit 104. The multiplexer 204 may accept a switching control signal that allows a signal incident to the input of the multiplexer 204 to be directed to any of the various outputs of the multiplexer 204. The switching control signal may be applied to the multiplexer 204 via bus 118, which is in communication with the multiplexer 204. In addition, or as an alternative to a multiplexer 204, any switching matrix that can operate at the frequency of the signal generated by transmitter 102, may replace the power distribution unit 104 (FIG. 1) or the multiplexer 204 without departing from the scope of the invention.

Use of a multiplexer may allow a control signal generating system 100 to direct a control signal to a particular location within which an object is detected. The object may include, or be carrying a wireless device. Directing the control signal to a particular location may avoid unnecessary emission of signal into areas not occupied by wireless devices. For example, a sensor, such as sensor B 124 may detect that an object is moving into a quiet zone. The sensor 124 may send a trigger signal to the trigger input unit 120, which in turn prompts controller 116 to perform certain actions. Among those actions may be the assertion of a command to multiplexer 204 to switch its input to an output port coupled to an antenna providing signal to the area covered by sensor B 124. The output port might be coupled to, for example, antenna B 108. Another action might be to command the transmitter 102 to generate and transmit a control signal.

FIGS. 1 and 2 have each been illustrated with three sensors and three antennas for ease of illustration. Any combination of numbers of sensors and numbers of antennas may be used without departing from the scope of the invention. Each antenna, in a system's set of antennas, need not be associated with a sensor.

Figure 3:
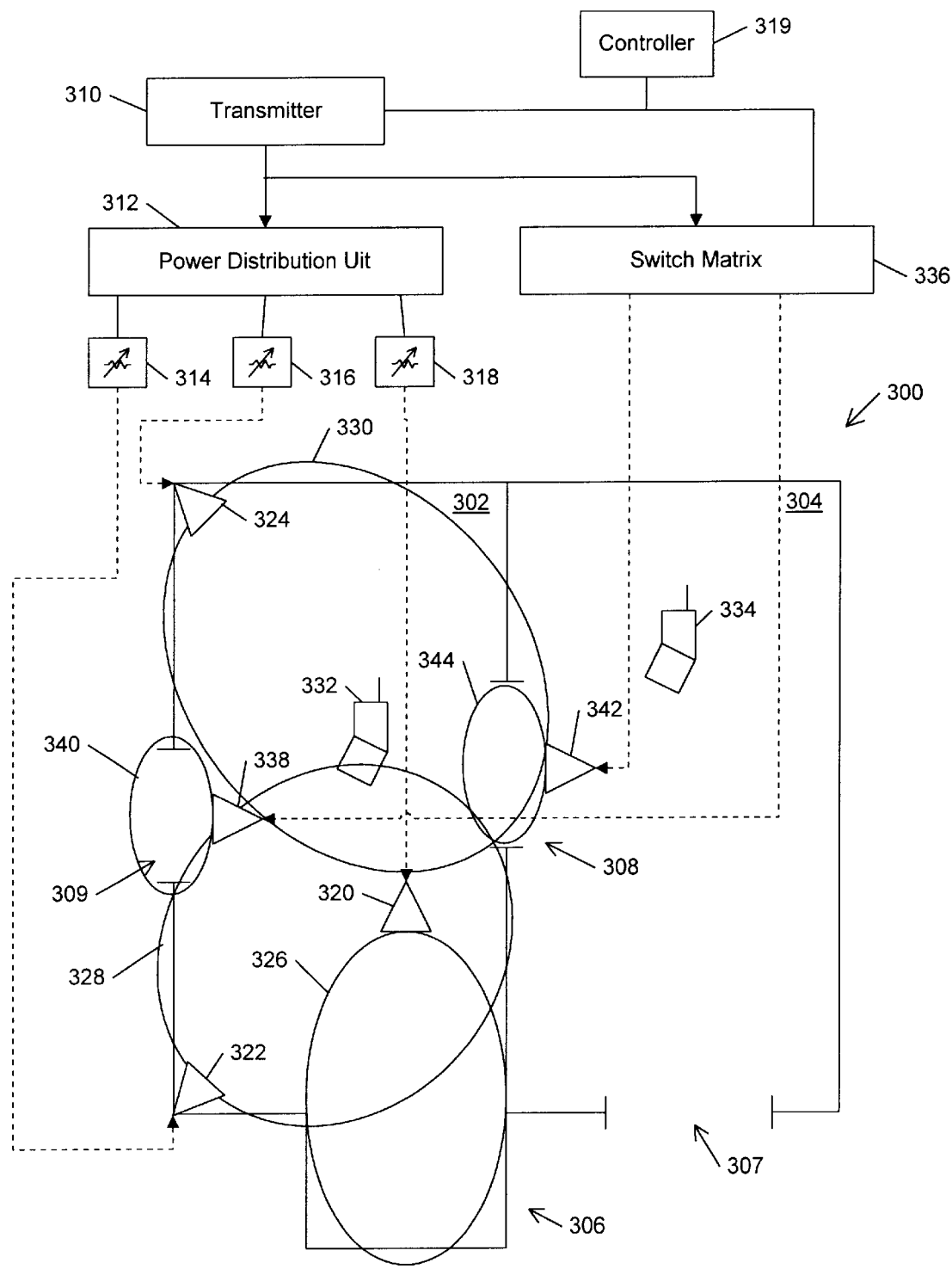
FIG. 3 illustrates a top view of an exemplary operational environment for a system in accordance with an embodiment of the invention.

FIG. 3 illustrates a top view of an exemplary operational environment for a system in accordance with an embodiment of the invention. The operational environment 300 includes a first area 302 and an adjacent second area 304. The first area 302 may be an area within which it is desirable that a wireless device not emit any audible alerts (i.e., a quiet zone). The adjacent second area 304 may be an area within which audible alerts from wireless devices are allowable. The areas need not be of equal size or shape. The shape of any area 302, 304 may be irregular. An irregularly shaped area is illustrated by the extension 306 of one boundaries of the first area 302. Various openings 307, 308, 309 allow for ingress and egress from the first and second areas 302, 304, respectively.

In FIG. 3, a transmitter 310 is coupled to an exemplary power distribution unit 312 having three outputs and one input. Each output of the power distribution unit 312 is coupled to a power controller 314, 316, 318. Power controllers 314, 316, 318 may be may be individually or collectively adjusted, either manually or via communication with the controller 319 (communication link not shown in FIG. 3 for ease of readability). An antenna 320, 322, 324 is coupled to one of the set of power controllers 318, 314, 316, respectively. The beamwidth of each of the antennas may be chosen so that substantially all of the first area 302 is radiated with signal coupled from the transmitter 310. Some overlap of antenna 320, 322, 324 radiation patterns may occur. Radiation patterns 326, 328, 330 of antennas 320, 322, 324, respectively, are illustrated by curvilinear lines emanating from the depicted antennas 320, 322, 324 and are meant to be illustrative and not limiting. Any radiation pattern sufficient to cause a detectable signal to be received at a wireless device would be within the scope of the invention.

As shown in the illustration of FIG. 3, radiated power may spill-over into the second area 304. Spill-over is illustrated by the radiation pattern of antenna 324 crossing into the second area 304. Spill-over into the second area 304 may be controlled by judicious placement of multiple directional or omnidirectional antennas, aimed to provide coverage substantially only within the first area 302 and/or by judicious selection of the power level to be radiated by each antenna.

A first wireless device 332 in the first area 302, in accordance with an embodiment of the invention, would receive a signal indicative of a command to disable its audible alert. A second wireless device 334 in the second area 304, in accordance with an embodiment of the invention, would not receive a signal indicative of a command to disable its audible alert and thus its audible alert would remain enabled.

FIG. 3 also illustrates a switch matrix 336 coupled to transmitter 310 and controller 319. Sensors at entry/exit ways 308, 309 may also be in communication with controller 319, however, these sensors are not shown in order to ease readability of FIG. 3. Sensors at entry/exit ways 308, 309 may detect the direction of motion of objects entering and exiting quiet zone 302. The sensors may communicate trigger signals to the controller 319. Controller 319 may then cause switch matrix 336 to select an antenna in the area where motion was detected and may further cause transmitter 310 to transmit a wireless device control signal which is a function of the detected direction of motion of the object. The control signal may then be emitted generally within the area in which motion was detected. For example a sensor covering entry/exit way 309 may detect an object entering quiet zone 302 and send a trigger signal to controller 319. Controller 319 may command switch matrix 336 to select antenna 338, which has an exemplary radiation pattern 340 substantially covering entry/exit way 309. The controller 319 may further command transmitter 310 to transmit a wireless device audible alert disable signal, which may be emitted from antenna 338. A similar sequence of events may occur as an object exits quiet zone 302 via entry/exit way 308, except that controller 319 might select antenna 342 having an exemplary radiation pattern 344, which substantially covers entry/exit way 308. Further controller 319 may command transmitter 310 to transmit a wireless device audible alert enable signal, to enable an audible alert of a wireless device moving with the object exiting quiet zone 302. The operation of an embodiment that generates control signals, as a function of detected direction of motion and/or location is further described with respect to FIG. 4.

Figure 4:
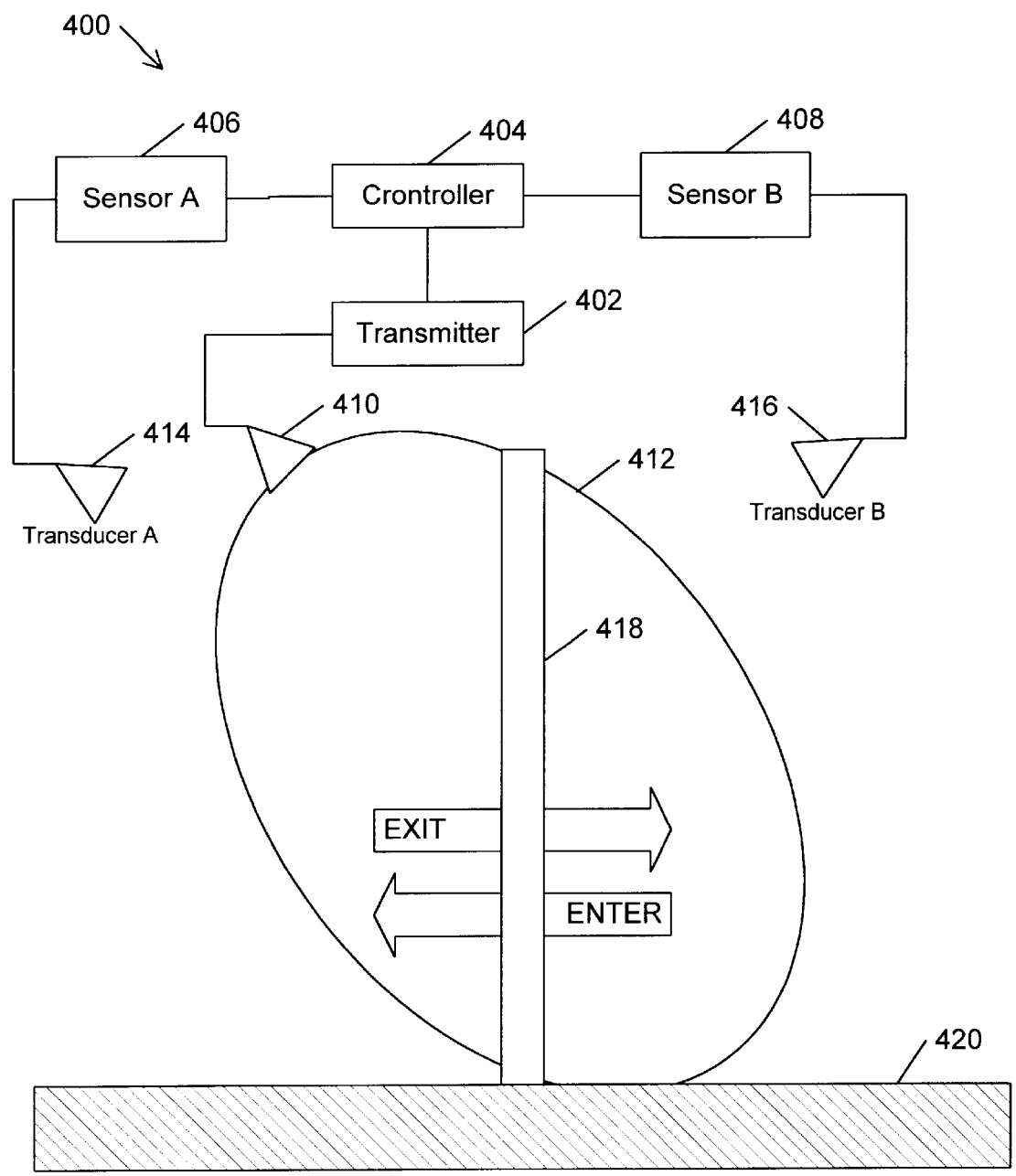
FIG. 4 illustrates a side view of another embodiment of a control signal generating system 400 in accordance with an embodiment of the invention.

FIG. 4 illustrates a side view of another embodiment of a control signal generating system 400 in accordance with an embodiment of the invention. In the embodiment of FIG. 4, control signal generating system 400 may include a transmitter 402 to generate the control signal. A controller 404 may be operatively coupled to the transmitter 402. One or more sensors 406, 408 may also be operatively coupled to the controller 404. The transmitter 402 may have at least one antenna 410 operatively coupled thereto, to radiate the control signal. An example of a radiation pattern 412 of the transmitter antenna 410 is illustrated in FIG. 4. Each sensor 406, 408 may include a transducer 414, 416, respectively, or some other type of device to detect the physical presence, and possibly a direction of motion, of an object. The sensors 406, 408 and/or their respective transducers 414, 416 may operate independently or collectively to determine the direction of motion of the object with respect to a reference point.

A physical or imaginary frame 418 substantially defining an opening through which a wireless device may pass may define the reference point. The frame 418, in effect, serves as a portal, or entry/exit way leading between a quiet zone area, such as area 302 (FIG. 3), and an area where audible alerts are permitted, such as area 304 (FIG. 3). The wireless device need not pass through the opening alone; it may pass through the opening with other objects. For example, a wireless device may be within a purse or backpack, or it may be carried on a belt or in a jacket of a person.

A physical frame 418 may rest on a surface 420, such as a floor. The frame 418 need not physically enclose the opening. An example of a frame 418 not physically enclosing the opening might be a frame comprised of two side pieces, the bottom of the frame being defined by a floor and the top of the frame being defined by an imaginary line connecting the tops of the two side pieces. An imaginary frame 418 may have no physical side pieces and no top or bottom. It may be generally defined by the edges of the operating field of the sensors 406, 408/transducers 414, 416 monitoring a given area in proximity of the frame 418. For example, an imaginary frame 418 of a control signal generating system 400 may be defined by the edges of a radiation pattern of an antenna such as antenna 414, coupled to sensor 412, which may, for example, be a radio frequency Doppler motion detector device.

The transducers 414, 416 may be directed or positioned such that they sense objects passing through the opening defined by the frame 418. The antenna 410 coupled to the transmitter 402 may be directed such that any wireless device control signal radiated from the antenna 410 substantially covers the opening defined by the frame 418. Only one transmitter antenna 410 is illustrated in FIG. 4, however, more than one transmitter antenna 410 is considered to be within the scope of the invention. If a first antenna 410 is utilized, its radiation pattern may be able to produce a signal at a sufficient power level such that a wireless device entering or exiting the opening substantially defined by the frame 418 may be controlled on either side of the frame 418. Alternatively, a second transmit antenna, not shown, may be used to provide coverage to a side of the frame 418 not substantially covered by the first antenna 410.

While two sensors 406, 408, and their respective transducers 414, 416 are illustrated in FIG. 4, other combinations of sensors and transducers, including a unitary sensor and transducer pair may be used to detect objects and determine the detected objects' direction of motion with respect to the frame 418. Furthermore, a sensor and transducer pair may be combined into a unitary device. The sensor 406, 408 and respective transducer 414, 416 may use any technology known to those of ordinary skill in the art, including, but not limited to infrared, optical, radio frequency, sonoacoustic, and pressure sensitive.

Use of motion detecting sensors may allow the control signal generating system 400 to adjust a transmitted control signal as a function of the motion of an object into or out of a quiet zone. That is, the control signal generating system 400 may transmit a disable signal when an object is detected entering a quiet zone and transmit an enable signal when the object is detected exiting a quiet zone.

Figure 5:
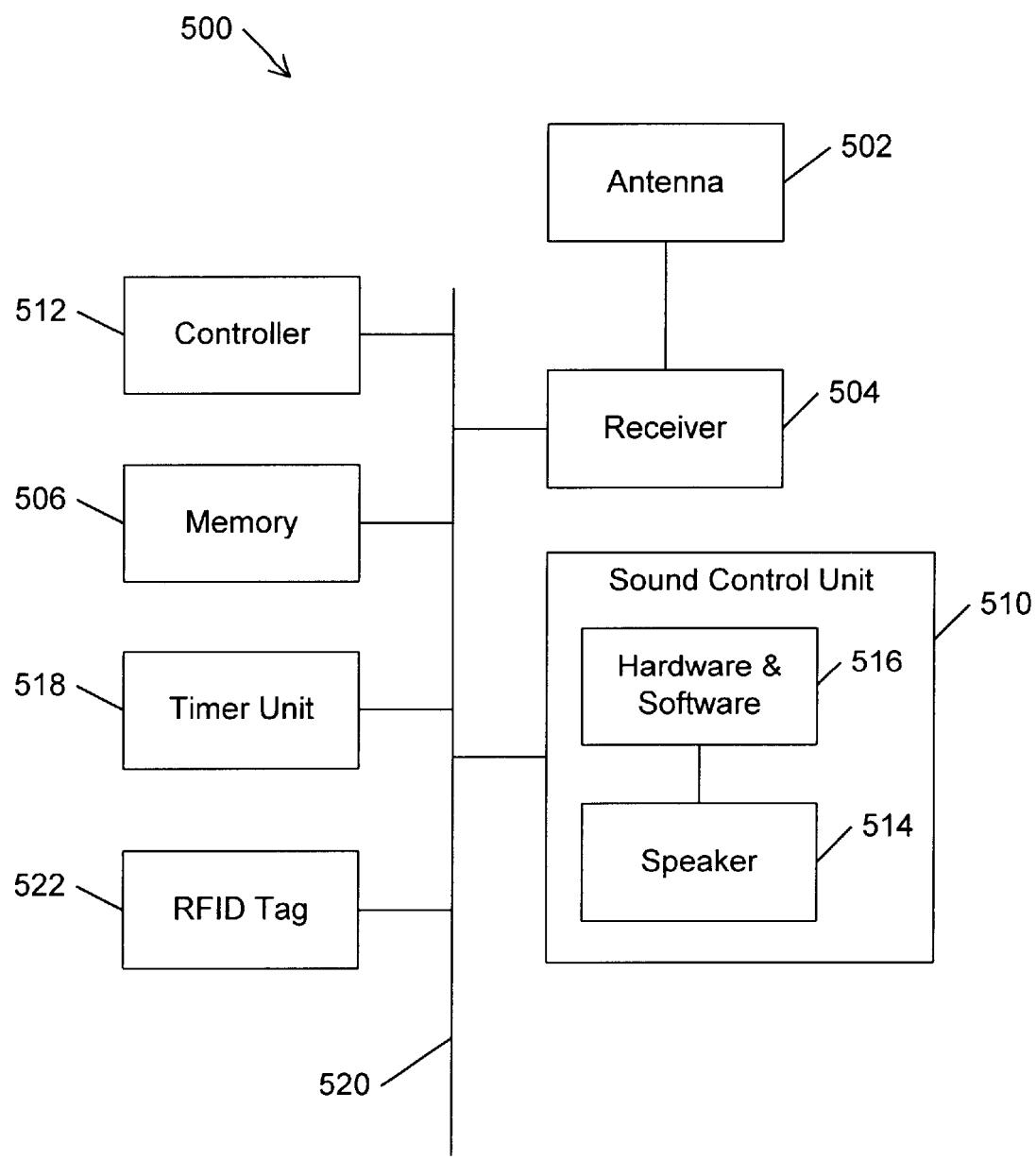
FIG. 5 is a block diagram of a wireless device 500 in accordance with an embodiment of the present invention.

FIG. 5 is a block diagram of a wireless device 500 in accordance with an embodiment of the present invention. The wireless device 500 may include an antenna 502, a receiver 504, a memory 506 to store, for example, an operating system, and a sound control unit 510 that may either enable or disable an audible alert of the wireless device, all coupled to a bus 520 for communication. A controller 512 may be in communication with components 504, 506, 510 of the wireless device 500 to control the operation of the wireless device 500.

The antenna 502 may couple a signal traveling in free space into the receiver 504. The signal may be the control signal transmitted from a control signal generating system in accordance with an embodiment of the invention. The receiver 504 may be any receiver capable of receiving the signal transmitted from the control signal generating system and processing it such that the controller 512 has an indication of, for example, a threshold crossing or demodulated data indicative of whether the wireless device's 500 audible alert is to be enabled or disabled.

The wireless device sound control system 510 may include a speaker 514 and hardware and software 516 to provide audible alerts to a user of the wireless device 500. The speaker 514 may be identical to a speaker used, for example, as the earpiece of the wireless device (e.g., the earpiece of a cellular telephone). Therefore, it may not be beneficial to disable all audio output of the wireless device 500. Some audio output functionality, with the exception of audible alerts, may be desired, even if the wireless device 500 is within a quiet zone, such as the first area 302 of FIG. 3. In other words, by disabling only the audible alerts, the speaker 514 may continue to be used by the wireless device 500 user to listen to a conversation on the cellular telephone, for example.

In one embodiment, the memory 506 may store the current state of the audible alert of the wireless device 500. That is, the memory 506 may retain data indicative of whether the audible alert is enabled or disabled.

In another embodiment, the wireless device 500 may further include a timer 518, implemented in hardware or software. The timer 518 may count an elapse time since an audible alert has been enabled or disabled. The timer 518 may count down a time until the audible alert may be enabled after having been disabled. The timer 518 may count down a time until the controller 512 is to check for the presence of the control signal. For example, a controller 512 may check for the control signal every five minutes. The timer 518 may be reset upon each decoding or reception of a control signal from a control signal generating system in accordance with an embodiment of the invention. The timer may be in communication with other components of the wireless device 500 via bus 520.

In another embodiment, the wireless device may further include a radio frequency identification (RFID) tag 522. The RFID tag 522 may include information that informs an RFID interrogator that the RFID tag 522 is associated with the wireless device 500. The RFID interrogator may then send a trigger signal to a wireless device control signal generating system (such as, for example, systems 100, 200, 300, or 400) to transmit a control signal to either enable or disable the audible alert of the wireless device. Determination of whether to enable or disable the audible alert may be based on a look-up table, stored in memory of a control signal generating system, which identifies the last known state of the audible alert of the wireless device associated with the RFID tag 522.

Figure 6:
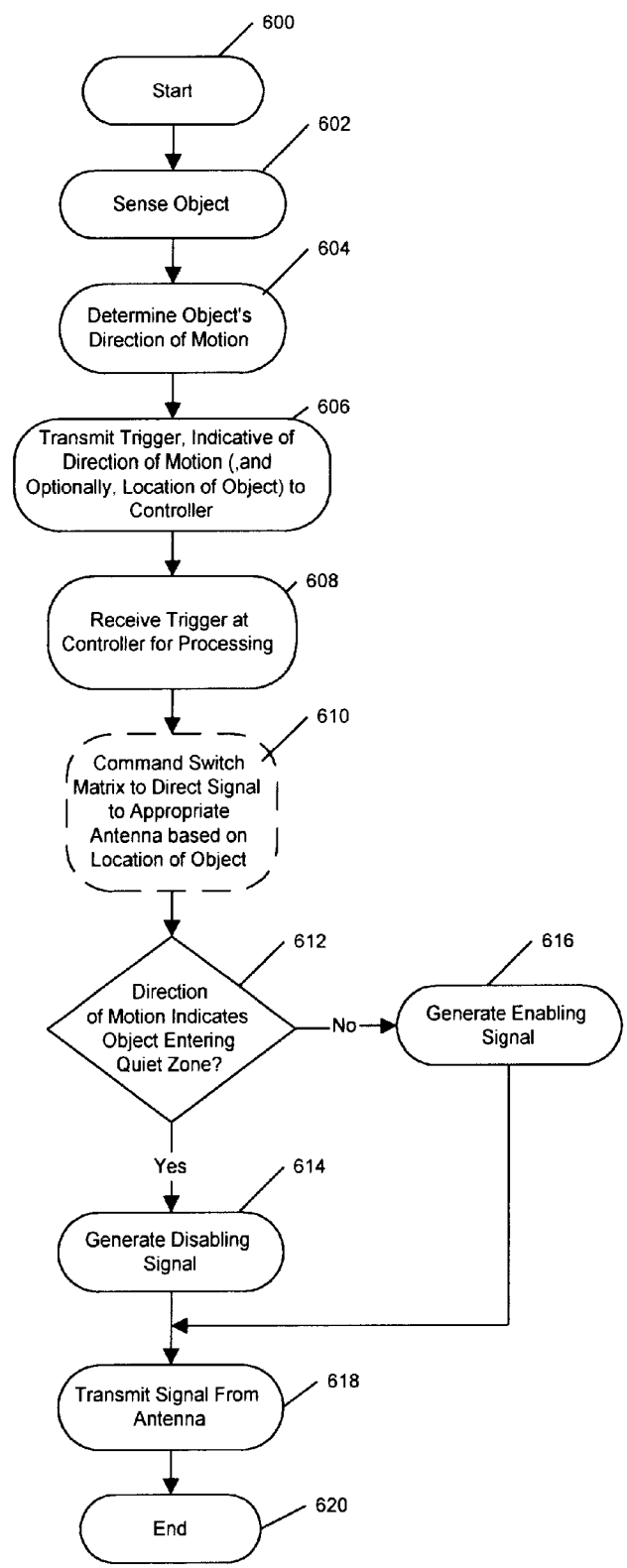
FIG. 6 is a flow diagram of a method of operation of a control signal generating system that includes a sensor to detect an object and its direction of motion, in accordance with an embodiment of the invention.

FIG. 6 is a flow diagram of a method of operation of a control signal generating system that includes a sensor to detect an object and its direction of motion, in accordance with an embodiment of the invention. The control signal generated may be a function of the direction of motion of the object. Selection of a control signal generating system transmit antenna may be selected as a function of the location of the object. The method may begin at step 600 and continue sequentially to step 620. The method is reiterative, in that the sensor may continuously be detecting the presence and/or direction of motion of objects. At step 602, a motion detector senses an object within the motion detector's operating range. The operating range may be approximately defined by a fixed geometry in relation to a sensor included with the motion detector. The motion detector operating range may be selected to provide motion detection capability in and around an area illuminated by an antenna of the of the control signal generating system. At step 604, the motion detector determines the direction of motion of the object. The direction of motion may be presented, for example, with respect to the location of an entry/exit way of a quiet zone. For, example, on one hand, the motion detector may indicate that the object is moving in a first direction, which may indicate that the object is travelling on a path that will probably result in the object entering a quiet zone. On the other hand, the motion detector may indicate that the object is moving in a second direction, which may indicate that the object is travelling on a path that will probably result in the object exiting the quiet zone. At step 606, the motion detector sends a signal, or trigger, to the controller 116 of the control signal generating system. The signal may be provided as a function of the direction of motion of the object, with respect to the object's potential entry or exit from the quiet zone. The signal may also be provided as a function of object location, if the control signal generating system has the capability of directing the signal in a certain direction, via selection of a certain antenna or via beam steering methods known to those of skill in the art. At step 608, the controller 116 receives that signal and processes it. Processing may be as simple as detecting if the signal is a binary 0 (e.g., the object is probably entering the quiet zone) or a binary 1 (e.g., the object is probably leaving the quiet zone), and generating the appropriate instruction for the transmitter based on the received information. At step 610, if the control signal generating system is capable of directing the signal to a certain location, then a command may be sent to direct the transmit signal to a certain antenna, the antenna covering the area where the object was sensed. At step 612, if the object is moving in a first direction (i.e., entering a quiet zone) then the controller 116 may instruct the transmitter to generate a disabling signal at step 614. On the other hand, at step 612, if the object is moving in a second direction (i.e., exiting a quiet zone) then the controller 116 may instruct the transmitter to generate an enabling signal at step 616. The transmitter's signal may then be transmitted from an antenna substantially illuminating the entry/exit way of the quiet zone, step 618. Thus, the signal transmitted from the antenna at step 618 may be received by any wireless device moving with the object through the entry/exit way of the quiet zone.

While the method of FIG. 6 is described as accommodating a bi-directional flow of objects passing through the entry/exit way, the method can also be practiced in an environment where objects pass in only one direction through the entry/exit way. In such an alternate embodiment one control signal generating system may be designated for objects entering a quiet zone and a second control signal generating system may be designated for objects exiting a quiet zone.

A disabling control signal may be transmitted once. The wireless device may be disabled until an enabling signal is received or until the wireless device is reset, by, for example, turning the wireless device off and on again. In another embodiment, the disabling signal may include a time period during which the audio alert of the wireless device may be disabled. The wireless device may use a timer integrated within the wireless device to count down the time until the wireless device may be enabled again. Additionally, as above, the wireless device may be re-enabled if an enabling signal is received or if the wireless device is reset.

Figure 7:
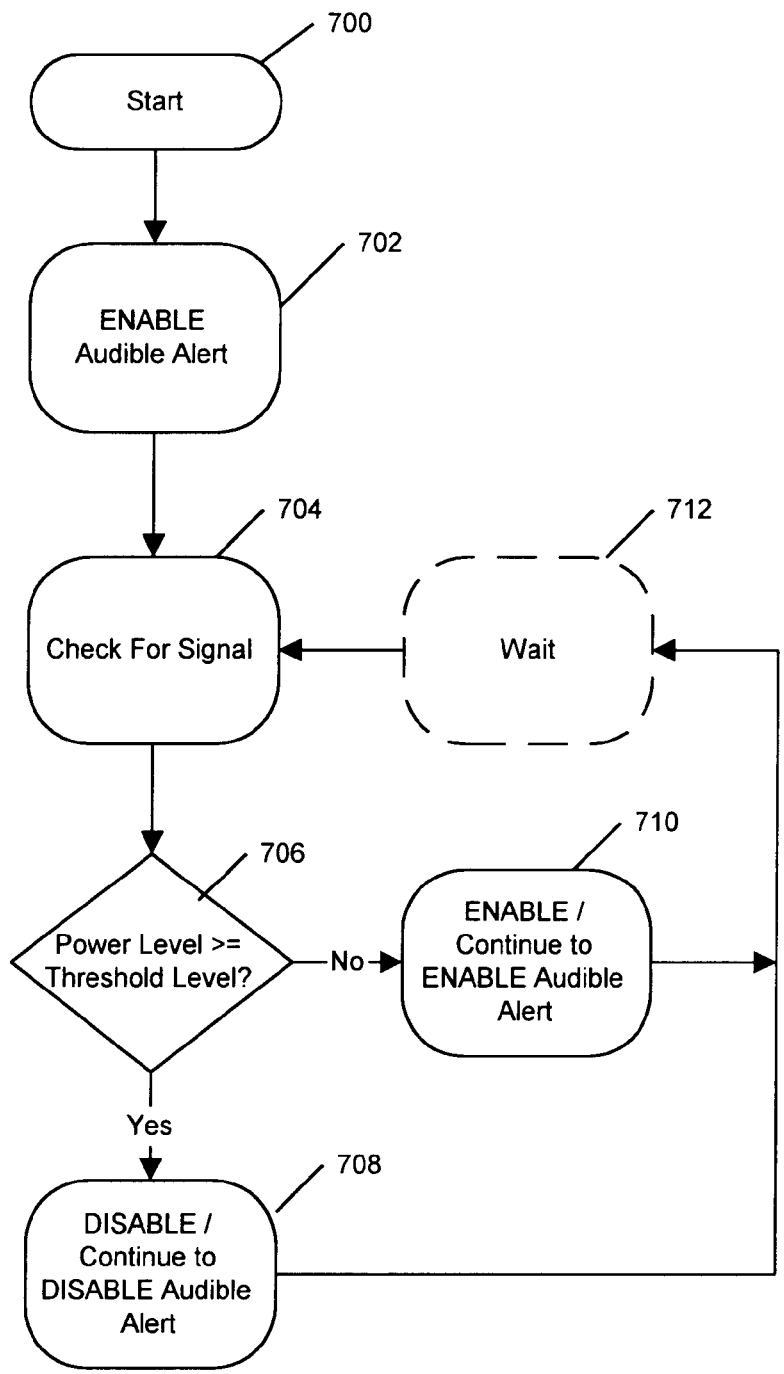
FIG. 7 is a flow diagram of a method in accordance with an embodiment of the invention.

FIG. 7 is a flow diagram of a method in accordance with an embodiment of the invention. The method of FIG. 7 may be used when the transmitter in accordance with an embodiment of the invention is configured to emit a control signal continuously, to disable wireless device audible alerts. In the absence of such a signal, or if the signal falls below a predefined threshold, the wireless device may default to a state wherein its audible alert is enabled. This method may be considered as a so-called fail-safe method because only when a signal is present and at or above a predetermined threshold level, will the wireless device disable its audible alert.

The method of FIG. 7 may start at step 700 and continue reiteratively. At step 702, the controller 512 of a wireless device enables audible alert functionality of the wireless device's sound control system. Enabling the audible alert at the beginning of the method ensures that the sound control system is in a known state. However, in some embodiments, it may not be necessary to have the sound control system in a known state at the start of the method. At step 704, the controller 512 may check for the presence of a signal. Checking for the presence of a signal may include detecting the power level of a signal in a frequency transmission band assigned for the practice of the invention. At step 706, the power level of a detected signal in the frequency transmission band may be compared to a predetermined threshold signal level. If the detected signal meets or exceeds the predetermined threshold signal level then, at step 708, the audible alert of the wireless device may be disabled by the controller 512. If, at step 708, the audible alert of the wireless device was already disabled, then, the controller 512 may continue to keep the audible alert in a disabled state.

If, at step 706, the detected signal fails to meet or exceed the predetermined threshold signal level then, at step 710, the controller 512 may enable the audible alert of the wireless device. On the other hand, if the audible alert of the wireless device was already enabled, then, the controller 512 may continue to keep the audible alert in an enabled state. The method of FIG. 7 is equally applicable to detection of an unmodulated carrier, as it is to detection of a power level of a modulated carrier signal.

Once the controller 512 has either disabled, at step 708, or enabled, at step 710, the audible alert of the wireless device, the controller 512 may immediately return to checking for a signal at step 704. In an alternate embodiment, the controller 512 may, at step 712, wait for a predetermined amount of time before again checking for transmitted control signal. The predetermined amount of time may be fixed or random. A timer unit, such as timer unit 518 may be used to count the time until the wireless device again checks for the transmitted control signal.

Figure 8:
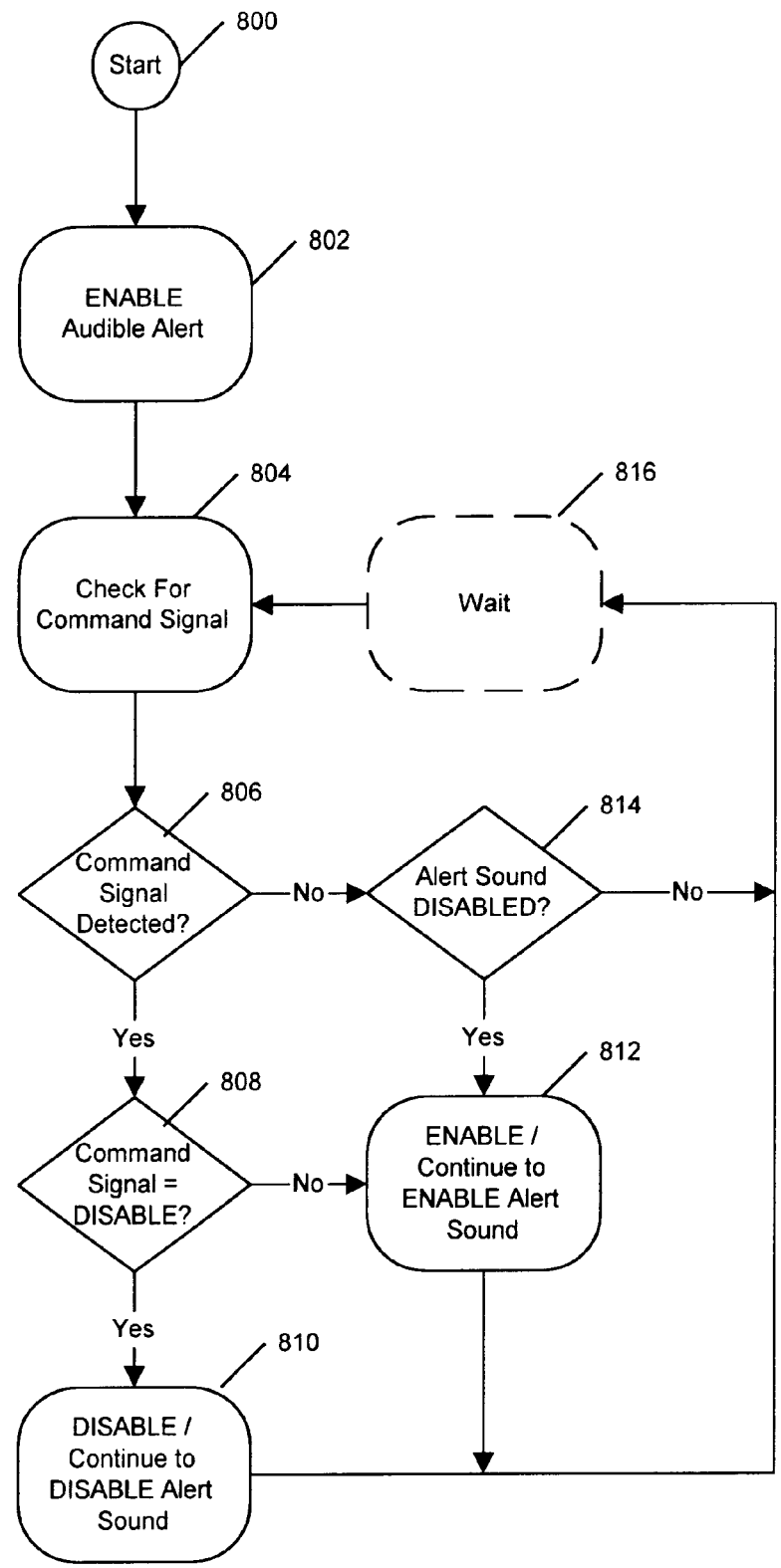
FIG. 8 is a flow diagram of another method in accordance with an embodiment of the invention.

FIG. 8 is a flow diagram of another method in accordance with an embodiment of the invention. The method of FIG. 8 may be used when the transmitter in accordance with an embodiment of the invention is configured to continuously emit a control signal to disable audible alerts. The method of FIG. 8 further may be used when the method of determining whether to disable an audible alert relies on receiving a signal containing data indicative of whether the audible alert is to be disabled or enabled. In the absence of such a signal, the wireless system would lack the data necessary to calculate whether the audible alert should be enabled or disabled. In one embodiment, a system using the method of FIG. 8 may latch the last value of the command signal and continue using that value to control the state of the audible alert. In the embodiment of FIG. 8, however, if the command signal is lost, and the audible alert was disabled, then the sound control system may default to an enabled audible alert state.

The method of FIG. 8 may begin at step 800 and continue reiteratively. At step 802, the controller 512 of a wireless device enables the audible alert functionality of the sound control system. Enabling the alert sound at the beginning of the method ensures that the sound control system is in a known state. However, in some embodiments, it may not be necessary to have the sound control system in a known state at the start of the method. At step 804, the controller 512 may check for the presence of a command signal. Checking for the presence of a command signal may include detecting the presence of demodulated data, which might be a bit or series of bits derived from a demodulated and decoded carrier signal. The characteristics of the command signal may change without departing from the scope of the invention.

However, in an embodiment, the command signal will either indicate that the wireless device audible alert is to be disabled, or that it is to be enabled. If, at step 806, the command signal is detected, then, at step 808, the command signal is decoded or it is otherwise determined that the command signal is either indicative of a command to disable, or a command to enable the audible alert. If, at step 808, the command signal is indicative of a command to disable the audible alert then at step 810, the audible alert of the wireless device may be disabled by the controller 512. If, at step 810, the audible alert of the wireless device was already disabled, then, the controller 512 may continue to keep the audible alert in a disabled state.

If, at step 808, the command signal is indicative of a command to enable the audible alert, then at step 812, the controller 512 may enable the audible alert of the wireless device. If, at step 812, the audible alert of the wireless device was already enabled, then, the controller 512 may continue to keep the audible alert in an enabled state.

If, at step 806, the command signal was not detected, then, at step 814, the controller 512 may determine the current state of the audible alert and if it is not currently disabled, then the operation may proceed to step 804. If however, the controller 512 identifies that the audible alert is disabled, then operation proceeds to step 812. At step 812, the controller 512 may enable the audible alert. In this manner, the sound system is returned to a default state (audible alert enabled) if the command signal is lost.

Once the controller 512 has either disabled, at step 810, or enabled, at step 812, the audible alert of the wireless device, the controller 512 may return to checking for a signal at step 804. In an alternate embodiment, the controller 512 may, at step 816, wait for a predetermined amount of time before again checking for a control signal. The predetermined amount of time may be fixed or random.

Figure 9:
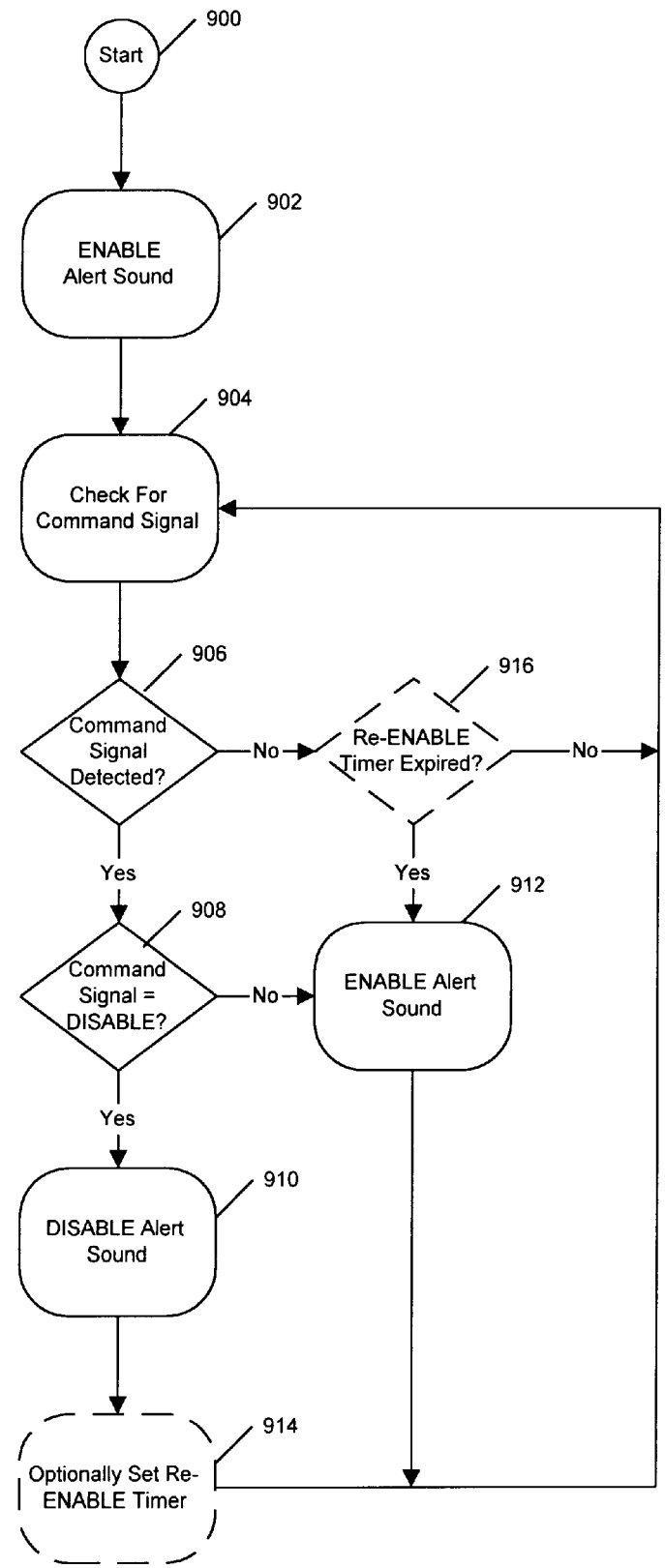
FIG. 9 is a flow diagram of another method in accordance with an embodiment of the invention.

FIG. 9 is a flow diagram of another method in accordance with an embodiment of the invention. The method of FIG. 9 may be used when the signal transmitted from a transmitter in accordance with an embodiment of the invention is configured to only transmit for a short period of time, perhaps no longer than the time necessary for the wireless device to pass through a doorway or other entry/exit way of a given location. The method of FIG. 9 may be used when the method of determining whether to disable the audible alert relies on receiving a signal containing data indicative of whether the audible alert is to be disabled or enabled. Once the data is decoded and the state of the audible alert is set, then the method of FIG. 9 ensures that the selection is latched into effect. The possible ways to change the state selection of the audible alert might be to latch a new command into the controller 512, or to reset the controller 512, perhaps by turning off and on the wireless device. In an alternate embodiment, a provision for timing-out the state selection of the audible alert may be provided.

The method may begin at step 900 and continue reiteratively. At step 902, the controller 512 of the wireless device may enable the functionality of the audible alert of the sound control system. Enabling the alert sound at the beginning of the method ensures that the sound control system is in a known state. However, in some embodiments, it may not be necessary to have the sound control system in a known state at the start of the method. At step 904, the controller 512 may check for the presence of a command signal. Checking for the presence of a command signal may include detecting the presence of demodulated data, which might be a bit or series of bits from a demodulated and decoded carrier signal. The characteristics of the command signal may change without departing from the scope of the invention. However, in an embodiment, the command signal will either indicate that the wireless device audible alert is to be disabled, or that it is to be enabled. If, at step 906, the command signal is detected, then, at step 908, the command signal is decoded or it is otherwise determined that the command signal is either indicative of a command to disable, or a command to enable the audible alert of the sound system. If, at step 908, the command signal is indicative of a command to disable the audible alert, then at step 910, the audible alert of the wireless device may be disabled by the controller 512.

If, at step 908, the command signal is indicative of a command to enable the audible alert, then at step 912, the controller 512 may enable the audible alert of the wireless device.

If, at step 906, the command signal was not detected, or, the controller 512 has either disabled, at step 910, or enabled, at step 912, the audible alert of the wireless device, the controller 512 may immediately return to checking for a signal at step 904.

In an alternate embodiment, the controller 512 may, at step 914, set a timer that could be used to trigger the controller 512 to re-enable the audible alert if another control signal to disable the audible alert has not been received and the timer has expired. The value for the timer could be included in the command signal, or could be a predetermined value stored in the memory of the wireless device. Downloading a re-enable time value could allow different quiet zones to specify disable time periods for wireless devices entering the particular quiet zone. For example, the re-enable timer might be set to 2 hours for a wireless device entering a movie theatre. The re-enable time value might be set to 30 minutes for a wireless device entering a library. After the re-enable timer has been set at step 914, the method may continue by returning to step 904, where the controller 512 may check for a command signal. If, at step 906, the command signal is not detected, then, at step 916, the controller 512 may determine if the re-enable timer has expired. If the re-enable timer has expired, then the method may proceed to step 912, where the controller would re-enable the audible alert. If the re-enable timer had not expired, the method may proceed to step 904, where the controller may check for a command signal.

Without optional step 914 and related optional step 916, if the audible alert was disabled, the controller 512 might remain in a loop of checking for a command signal if the wireless device somehow left the quiet zone area without having its audible alert re-enabled. A wireless device user may not be aware of this situation, which might otherwise be remedied by, perhaps, reinitializing the controller 512 of the wireless device.

In each of the embodiments presented above, the invention works in cooperation with the wireless device to disable the wireless device's audible alert when the wireless device is in a quiet zone. During operation of the invention, all functions of the wireless device remain operational; no jamming signal is used. For example, a cellular telephone could continue to receive and transmit calls, or a pager could continue to receive pages even if its audible alert was disabled. Use of the invention allows the audible alert to the wireless device to be disabled without any user intervention. Users may still be notified of, for example, incoming messages, by having the wireless device switch from audible alert to vibration alert or a visual alert, such as those used by the hearing impaired. Furthermore, a system in accordance with the invention may bring about the generation of a stationary vibrating alert, which is not worn but rather is installed in a quiet zone to create a low frequency vibration detectable by occupants of the quiet zone.

The disclosed embodiments are illustrative of the various ways in which the present invention may be practiced. Other embodiments can be implemented by those skilled in the art without departing from the spirit and scope of the present invention.

What is claimed is:

1. A wireless device audible alert control signal generating system comprising:

a transmitter to transmit a control signal indicative of a command to one of disable and enable an audible alert of a wireless device;

a switch matrix operatively coupled to the transmitter to distribute the control signal;

a plurality of antennas operatively coupled to the switch matrix to radiate the control signal to respective spatial areas;

a sensor to determine a direction of motion of an object substantially within a first spatial area; and a controller operatively coupled to the transmitter, the switch matrix, and the sensor, the controller:

commanding the switch matrix to operatively couple a first antenna illuminating the first spatial area to the transmitter if the sensor detects a direction of motion of the object in the first spatial area, and commanding the transmitter to emit a control signal as a function of the determined direction of motion of the object.

2. The control signal generating system of claim 1, wherein the control signal does interfere with reception of other signals intended to be received by the wireless device.

3. The control signal generating system of claim 1, wherein the switch matrix is a multiplexer.

4. The wireless device sound control system of claim 1, wherein the sensor is one of infrared, radio frequency, sonoacoustic, and pressure sensitive.

5. The control signal generating system of claim 1, further comprising a frame having an opening through which the object must pass in order to one of gain entry to and exit from a quiet zone.

6. The control signal generating system of claim 5, the frame substantially transects the first spatial area.

7. The control signal generating system of claim 5, wherein the sensor detects the direction of motion of the object substantially within the frame.

8. The control signal generating system of claim 1, wherein the control signal control which is a function of the determined direction of motion of the object is a control signal to:

disable the audible alert of the wireless device if the direction of motion of the object is in a first direction, and enable the audible alert of the wireless device if the direction of motion of the object is in a second direction.

* * * * *

UNITED STATES PATENT AND TRADEMARK OFFICE
CERTIFICATE OF CORRECTION

PATENT NO.        : 6,823,199 B2
APPLICATION NO. : 09/893873
DATED             : November 23, 2004
INVENTOR(S)       : Gough It is certified that error appears in the above-identified patent and that said Letters Patent is hereby corrected as shown below:

Column 13

Line 27, change "detects a direction" to -- detects the direction --

Line 29, change "a control signal" to -- the control signal --

Line 31, change "of the object." to --of the object, wherein the control signal one of enables and disables the wireless device audible alert. --

Signed and Sealed this

Twentieth Day of February, 2007

JON W. DUDAS
*Director of the United States Patent and Trademark Office*